United States Patent
Kato (10) Patent No.: US 6,542,278 B2
(45) Date of Patent: Apr. 1, 2003

(54) SCANNING OPTICAL APPARATUS AND IMAGE-FORMING APPARATUS USING IT

(75) Inventor: Manabu Kato, Utsunomiya (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/774,039

(22) Filed: Jan. 31, 2001

(65) Prior Publication Data

US 2002/0044326 A1 Apr. 18, 2002

(30) Foreign Application Priority Data

Feb. 1, 2000 (JP) ........................................ 2000-023866

(51) Int. Cl.[7] .............................................. G02B 26/08
(52) U.S. Cl. .................... 359/205; 359/207; 359/216; 359/204; 347/243; 347/244; 347/259
(58) Field of Search ................. 359/204, 207, 359/212, 216–219; 347/233, 243, 244, 258–261

(56) References Cited

U.S. PATENT DOCUMENTS

| | | | | |
|---|---|---|---|---|
| 5,418,639 A | * | 5/1995 | Yamazaki ............... | 359/216 |
| 5,557,446 A | | 9/1996 | Kato ...................... | 359/206 |
| 5,600,476 A | | 2/1997 | Takada et al. .......... | 359/206 |
| 5,818,505 A | | 10/1998 | Kato ...................... | 347/258 |
| 5,883,732 A | | 3/1999 | Takada et al. .......... | 359/207 |
| 5,963,356 A | | 10/1999 | Kato ...................... | 359/216 |
| 5,966,161 A | | 10/1999 | Kato ...................... | 347/258 |
| 5,995,131 A | | 11/1999 | Fujibayashi et al. ... | 347/258 |
| 6,038,053 A | | 3/2000 | Kato ...................... | 359/205 |
| 6,094,286 A | | 7/2000 | Kato ...................... | 359/206 |
| 6,133,935 A | | 10/2000 | Fujibayashi et al. ... | 347/258 |
| 6,154,245 A | | 11/2000 | Kato ...................... | 347/244 |

FOREIGN PATENT DOCUMENTS

| | | |
|---|---|---|
| EP | 730182 | 9/1996 |
| JP | 8-297256 | 11/1996 |

* cited by examiner

*Primary Examiner*—James Phan
(74) *Attorney, Agent, or Firm*—Fitzpatrick, Cella, Harper & Scinto

(57) ABSTRACT

There are provided a compact scanning optical apparatus optimal for high-definition image recording, which is able to uniformize the spot size in the sub-scanning direction in an effective scanning area, and an image-forming apparatus using it. For carrying out scanning by guiding a beam emitted from a light source, through first and second optical elements to a deflecting element and focusing the beam reflectively deflected by the deflecting element on a surface to be scanned, by a third optical element, the third optical element has two or more lenses, radii of curvatures in the sub-scanning direction of a lens surface of at least one lens La out of the two or more lenses continuously change from on the axis toward off the axis in the main scanning direction, a rate of change of the curvatures in the sub-scanning direction within one beam on the lens surface is set to not more than 10%, and the shape of the lens La in the main scanning direction is determined so that F-numbers in the sub-scanning direction of the beam incident to the surface to be scanned are approximately constant in the effective scanning area.

12 Claims, 8 Drawing Sheets

SCANNING OPTICAL APPARATUS AND IMAGE-FORMING APPARATUS USING IT

BACKGROUND OF THE INVENTION

1. Field of the Invention

The present invention relates to a scanning optical apparatus and an image-forming apparatus using it and, more particularly, is suitably applicable to apparatus, for example, such as laser beam printers, digital copiers, etc. involving the electrophotographic process, constructed to reflectively deflect light optically modulated and emitted from a light source means, by a deflecting element consisting of a rotary polygon mirror or the like (i.e., deflect the light to scan) and thereafter optically scan an area on a surface to be scanned, through an imaging element with the f-characteristic to record image information on the surface.

2. Related Background Art

In the scanning optical apparatus such as the laser beam printers (LBPs) and the like heretofore, the image recording was carried out in such a way that the light optically modulated and emitted according to an image signal from the light source means is periodically deflected by an optical deflector, e.g., consisting of a rotary polygon mirror (polygon mirror) and is condensed in a spot shape on a surface of a photosensitive recording medium (photosensitive drum) by an imaging optical system with the fθ characteristic to optically scan the area on the surface.

Figure 13:
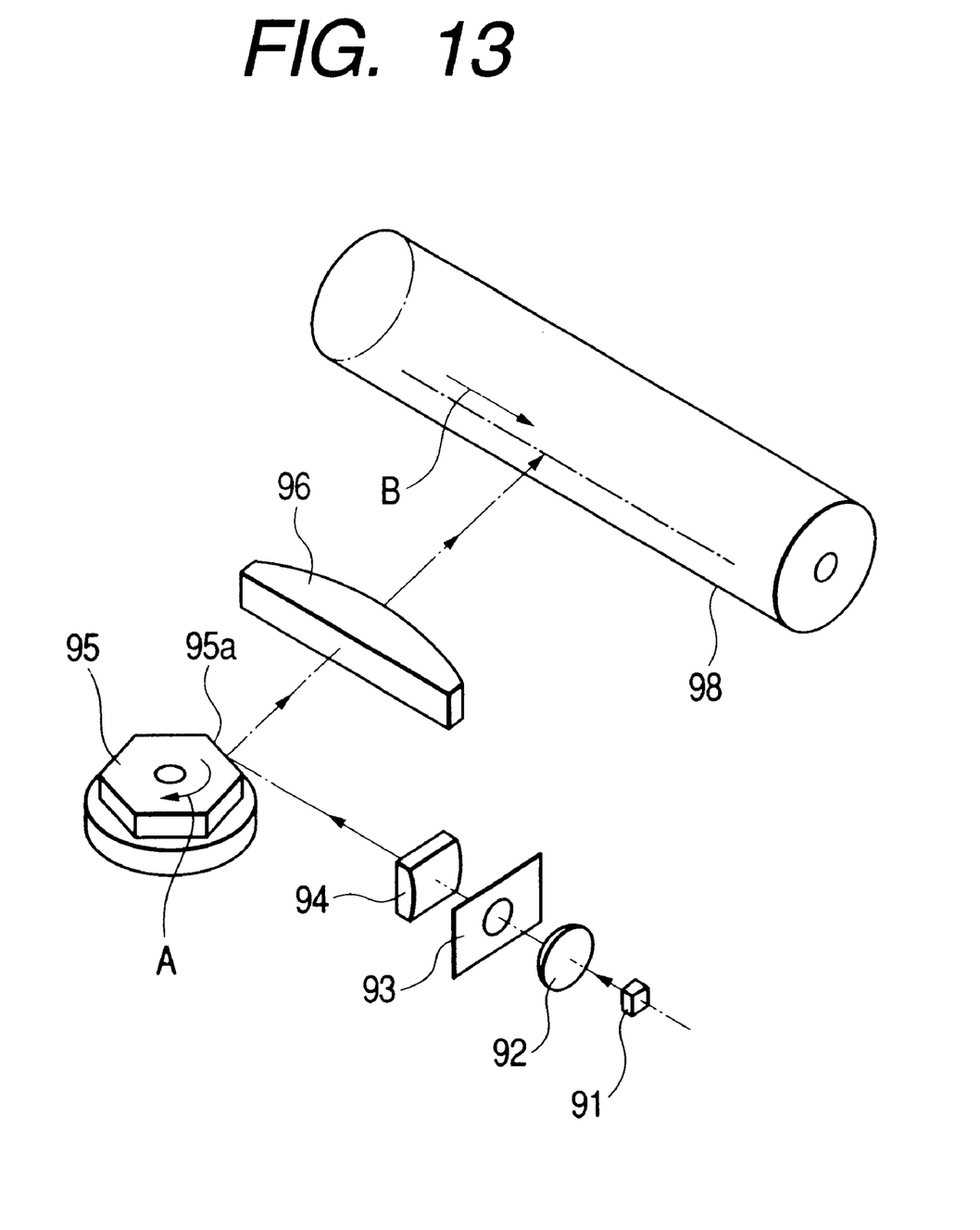
FIG. 13 is a schematic diagram to show the major part of the conventional scanning optical apparatus.

FIG. 13 is a schematic diagram to show the major part of a conventional scanning optical apparatus.

In FIG. 13 a diverging beam emitted from light source means 91 is converted into a nearly parallel beam by a collimator lens 92 and the beam is limited by a stop 93 to enter a cylindrical lens 94 having a predetermined refracting power only in the sub-scanning direction. The nearly parallel beam incident to the cylindrical lens 94 emerges in the original state in the main scanning section. However, the beam is condensed in the sub-scanning section to be focused as an approximately linear image on a deflection facet (reflective surface) 95a of an optical deflector 95 consisting of a polygon mirror.

The beam reflectively deflected by the deflection facet 95a of the optical deflector 95 is then guided through an imaging optical system with the fθ characteristic (fθ lens system) 96 onto a photosensitive drum surface 98 as a surface to be scanned. The optical deflector 95 is rotated in the direction of arrow A to optically scan the area on the photosensitive drum surface 98 in the direction of arrow B, thereby recording the image information thereon.

In order to record the image information with high accuracy, the scanning optical apparatus of this type needs to meet requirements that the curvature of field be corrected for well throughout the entire surface to be scanned, so as to maintain the spot size uniform and that the optical system have such distortion (fθ characteristic) as to establish a proportional relation between angle of incident light and image height.

In addition to this, it is recently becoming important in order to implement high-definition printing, (1) to equalize the spot diameter in the sub-scanning direction in an effective image area (effective scanning area); (2) to equalize the spacing between adjacent pitches in the effective image area in the case of multi-beam scanning; and so on, and it is necessary to equalize the F-number (Fno) in the sub-scanning direction of the beam incident to the surface to be scanned, in the effective image area.

Japanese Patent Application Laid-Open No. 8-297256, which was filed previously by the assignee of the present application, describes the technology of equalizing Fno in the sub-scanning direction of the beam incident to the surface to be scanned, in the effective image area, by changing radii of curvatures in the sub-scanning direction of at least two lens surfaces of lenses constituting the image optical system (third optical element), from on the axis toward off the axis in the main scanning direction.

An object of the present invention is to provide a compact scanning optical apparatus optimal for high-definition image recording and an image-forming apparatus using it, which can equalize the spot size in the sub-scanning direction in the effective scanning area and equalize the adjacent pitch spacing in the effective scanning area in the case of multi-beam scanning, by making up a third optical element of two or more lenses, continuously changing radii of curvatures in the sub-scanning direction of a lens surface of at least one lens out of the two or more lenses, from on the axis toward off the axis in the main scanning direction, setting a rate of change of the curvatures in the sub-scanning direction within one beam on the lens surface to not more than 10%, and determining the shape of the lens having the lens surface in the main scanning direction so that the F-number in the sub-scanning direction of the beam incident to the surface to be scanned, becomes approximately constant in the effective scanning area.

SUMMARY OF THE INVENTION

A scanning optical apparatus according to one aspect of the present invention is a scanning optical apparatus comprising a deflecting element for reflectively deflecting a beam emitted from light source means, into a main scanning direction, and an optical element for focusing the beam reflectively deflected by the deflecting element, on a surface to be scanned, wherein said optical element comprises two or more lenses, radii of curvatures in a sub-scanning direction of at least one lens surface of at least one lens La out of said two or more lenses continuously change from on the axis toward off the axis in the main scanning direction, a rate of change of the curvatures in the sub-scanning direction within one beam on the lens surface is set to not more than 10%, and a shape of the lens La in the main scanning direction is determined so that F-numbers in the sub-scanning direction of the beam incident to the surface to be scanned are approximately constant in an effective scanning area.

In the scanning optical apparatus according to another aspect of the invention, the shape of the lens La in the main scanning direction is determined so that at least one lens surface has a center of curvature on the deflecting element side.

In the scanning optical apparatus according to another aspect of the invention, said lens La is located at a position closest to the surface to be scanned, out of the two or more lenses constituting said optical element.

In the scanning optical apparatus according to another aspect of the invention, the following condition is satisfied:

$$\phi mL < \phi sL,$$

where $\phi mL$ is a power of said lens La in the main scanning direction and $\phi sL$ a power thereof in the sub-scanning direction.

In the scanning optical apparatus according to another aspect of the invention, the following condition is satisfied:

$$\phi mL/\phi mf < 0.5,$$

where φmL is a power of said lens La in the main scanning direction and φsL a power of the whole of said optical element in the main scanning direction.

In the scanning optical apparatus according to another aspect of the invention, the following condition is satisfied:

$$0.5 < \phi sL/\phi sf,$$

where φsL is a power of said lens La in the sub-scanning direction and φsf a power of the whole of said optical element in the sub-scanning direction.

In the scanning optical apparatus according to another aspect of the invention, said lens La is disposed on the surface-to-be-scanned side with respect to a middle point between a deflection point on said deflecting element and said surface to be scanned.

In the scanning optical apparatus according to another aspect of the invention, said lens La is made by plastic molding.

In the scanning optical apparatus according to another aspect of the invention, image magnifications in the sub-scanning direction are approximately constant in the effective scanning area.

In the scanning optical apparatus according to another aspect of the invention, said light source means comprises a plurality of light emitting regions.

In the scanning optical apparatus according to another aspect of the invention, the beam emitted from said light source means is focused in the form of a linear beam longer than one deflection facet out of a plurality of deflection facets of the deflecting element in the main scanning direction, on the deflection facet.

An image-forming apparatus according to still another aspect of the present invention is an image-forming apparatus comprising either of the scanning optical apparatus as set forth, and a printer controller for converting code data supplied from an external device, into an image signal and then entering the image signal into said scanning optical apparatus.

In the image-forming apparatus according to another aspect of the invention, an image is formed by background exposure.

DETAILED DESCRIPTION OF THE PREFERRED EMBODIMENTS

Embodiment 1

Figure 1:
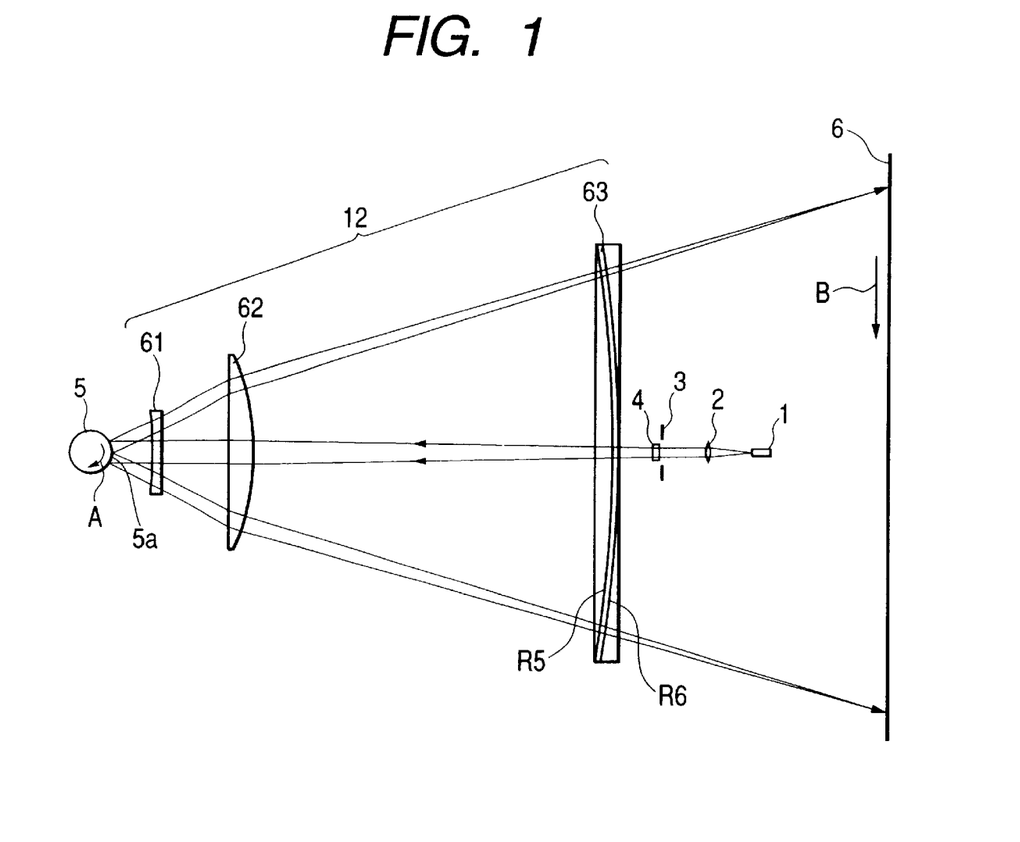
FIG. 1 is a cross-sectional view to show the major part in the main scanning direction of Embodiment 1 of the present invention.
Figure 2:
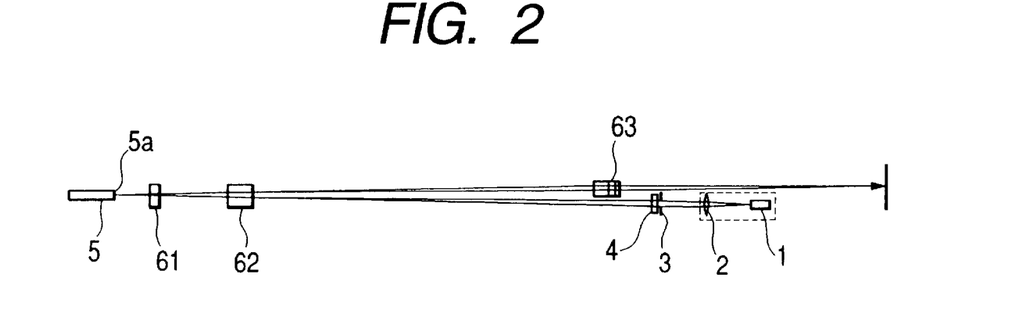
FIG. 2 is a cross-sectional view to show the major part in the sub-scanning direction of Embodiment 1 of the present invention.

FIG. 1 is a cross-sectional view of the major part in the main scanning direction (main scanning section) of Embodiment 1 of the scanning optical apparatus of the present invention and FIG. 2 a cross-sectional view of the major part in the sub-scanning direction (sub-scanning section) of FIG. 1.

In the figures, reference numeral 1 designates a light source means, which consists, for example, of a semiconductor laser. Numeral 2 denotes a conversion element (collimator lens) as a first optical element, which converts a diverging beam emitted from the light source means 1, into a weakly diverting beam. Numeral 3 represents an aperture stop, which limits a passing beam (amount of light). Numeral 4 indicates a cylindrical lens as a second optical element, which has a predetermined refracting power only in the sub-scanning direction and which focuses the light having passed through the aperture stop 3, as an almost linear image on deflection facets 5a of an optical deflector (deflecting element) 5, which will be described hereinafter, in the sub-scanning section.

Numeral 5 denotes the optical deflector, for example, consisting of a polygon mirror (a rotary polygon mirror) as a deflecting element, which is rotated at a constant speed in the direction of arrow A by a driving means such as a motor or the like (not illustrated).

Numeral 12 designates an fθ lens system (imaging optical system) with the f-characteristic as a third optical element, which has three lenses, a concave spherical lens 61, a convex cylinder lens (convex cylindrical lens) 62, and a long cylinder lens (long cylindrical lens) 63 made by plastic molding, in their respective shapes described hereinafter, in the order named from the side of the optical deflector 5. The overall lens system has predetermined refracting powers different from each other between in the main scanning direction and in the sub-scanning direction, focuses the beam based on the image information, reflectively deflected (deflected to scan) by the optical deflector 5, on the surface 6 to be scanned, and corrects surface inclination of the deflection facets 5a of the optical deflector 5.

In the present embodiment the radii of curvatures in the sub-scanning direction of an exit surface R6 of the long cylinder lens 63 are continuously changed from on the axis toward off the axis in the main scanning direction (image height direction) and the rate of change of the curvatures in the sub-scanning direction within one beam on the exit surface R6 is set to not more than 10%. Further, the shape of the long cylinder lens 63 in the main scanning direction is determined so that the F-numbers (Fno) in the sub-scanning direction of the beam incident to the surface to be scanned 6 become approximately constant in the effective scanning area.

Numeral 6 designates a surface of a photosensitive drum as a surface to be scanned.

In the present embodiment the diverging beam optically modulated and emitted from the semiconductor laser 1 is converted into the weakly diverging beam and the beam thus converted is limited in the amount of light by the aperture stop 3 to enter the cylindrical lens 4. With the beam incident to the cylindrical lens 4, the beam is converged in the sub-scanning section, travels through the convex cylinder lens 62 and concave spherical lens 61, and is incident onto the deflection facets 5a of the optical deflector 5, so as to be focused as an almost linear image (a linear image longitudinal in the main scanning direction) in the vicinity of the deflection facets 5a. At this time the beam impinging on the deflection facets 5a is incident at a predetermined angle to a plane normal to a rotational axis of the optical deflector 5 (i.e., a rotational plane of the optical deflector), in the sub-scanning section including the rotational axis of the optical deflector 5 and the optical axis of the fθ lens system 12 (an oblique incidence optical system). Namely, the beam from the cylindrical lens 4 is incident from an inclined direction to the deflection facets 5a in the sub-scanning section.

In the other main scanning section the beam travels through the convex cylinder lens 62 and the concave spherical lens 61 in the original state (i.e., in the state of the weakly diverging beam), so as to be converted into a nearly parallel beam, and then the beam is incident from the approximate center of the deflection angle of the optical deflector 5 to the deflection facets (frontal incidence). The beam width of the nearly parallel beam at this time is set so as to be sufficiently wider than the facet width of the deflection facets 5a of the optical deflector 5 (or so as to cross a plurality of deflection facets) in the main scanning direction (an overfield scanning optical system).

Then the beam reflectively deflected by the deflection facets 5a of the optical deflector 5 is guided through the concave spherical lens 61, the convex cylinder lens 62, and the long cylinder lens 63 onto the photosensitive drum surface 6 to optically scan the photosensitive drum surface 6 in the direction of arrow B (in the main scanning direction) with rotation of the optical deflector 5 in the direction of arrow A. This implements the image recording on the photosensitive drum surface 6 as a recording medium.

In the present embodiment the lens (optical element) having the aspherical surface is expressed by the following shape representation equations. The lens shape is expressed as follows, for example, using a coordinate system wherein the origin is set at an intersection between the lens and the optical axis, the x-axis is taken along the direction of the optical axis, the Y-axis along an axis perpendicular to the optical axis in the main scanning surface, and the z-axis along an axis perpendicular to the optical axis in the sub-scanning surface. The shape in the meridional direction corresponding to the main scanning direction is expressed by the following equation:

$$x=(Y^2/R)/[1+(1-(1+K)(Y/R)^2)^{1/2}]+B_4Y^4+B_6Y^6+B_8Y^8+B_{10}Y^{10}$$

(where R is the radius of curvature, and K, $B_4$, $B_6$, $B_8$, and $B_{10}$ are aspherical coefficients).

The shape in the sagittal direction corresponding to the sub-scanning direction (the direction including the optical axis and being perpendicular to the main scanning direction) is expressed by the following equation:

$$S=(Z^2/r')/[1+(1-(Z/r')^2)^{1/2}]$$

where $$r'=r_0(1+D_2Y^2+D_4Y^4+D_6Y^6+D_8Y^8+D_{10}Y^{10})$$

(where $r_0$ is the radius of sagittal curvature on the optical axis, and $D_2$, $D_4$, $D_6$, $D_8$, and $D_{10}$ are aspherical coefficients).

In the present embodiment, as described above, the radii of curvatures in the sub-scanning direction of only the exit surface R6 of the long cylinder lens 63 forming one element of the fθ lens system 12 are continuously changed from on the axis toward off the axis in the main scanning direction (the image height direction), and the other lens surfaces include no aspherical component.

Now let us describe the change of the curvatures in the sub-scanning direction within one beam on the lens surface. In order to equalize the entrance Fno in the sub-scanning direction on the surface to be scanned and satisfy the imaging performance in the sub-scanning direction, it is necessary to continuously change the radii of curvatures in the sub-scanning direction of the lens from on the axis toward off the axis in the main scanning direction. However, if the change is too quick in the radii of curvatures in the sub-scanning direction within one beam on the lens surface, coma or the like will degrade the wavefront aberration and decrease the depth of focus.

Figure 3:
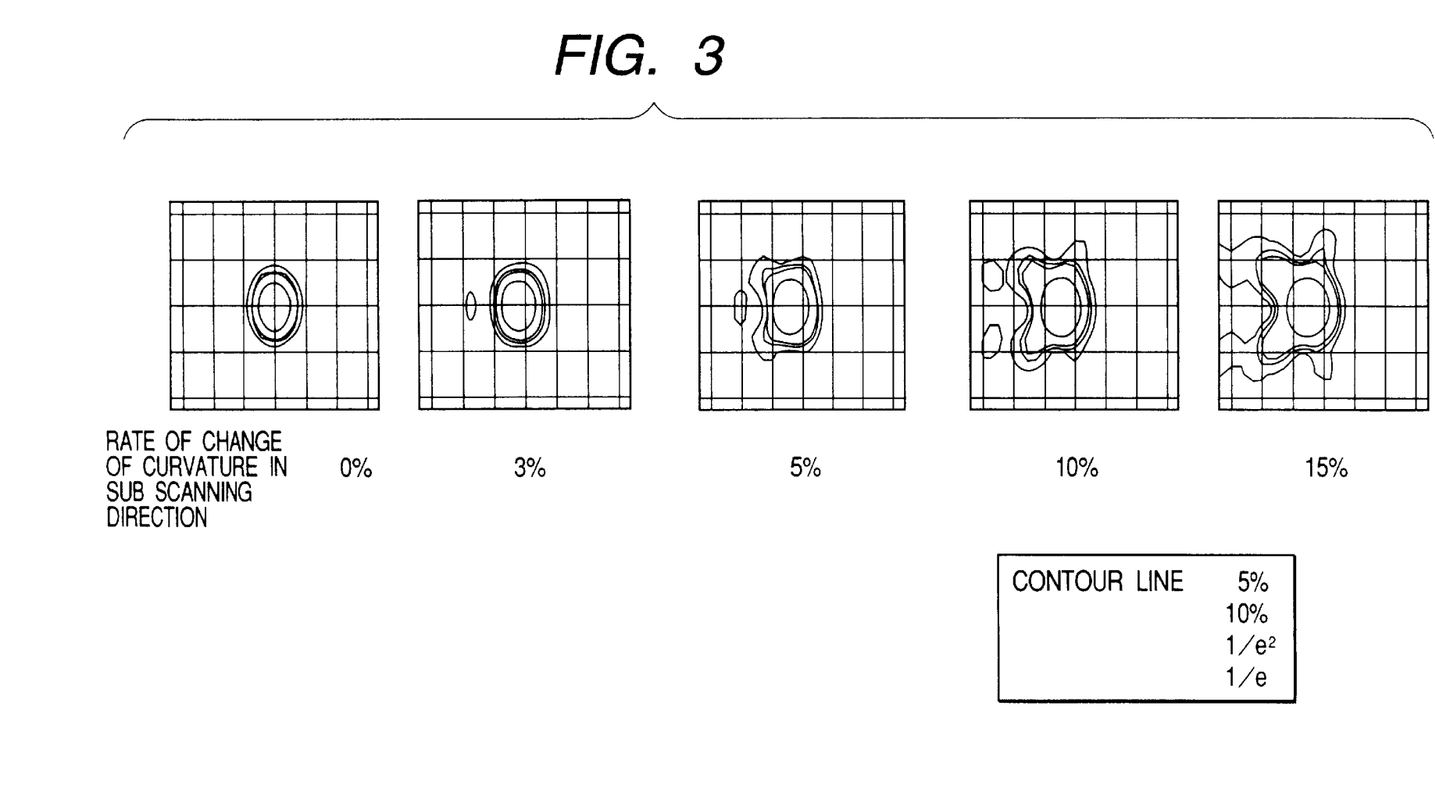
FIG. 3 is a drawing to show spot profiles (contour lines of spots) at various curvature change rates in the sub-scanning direction within one beam on a lens surface in comparative examples.

FIG. 3 is an explanatory diagram to show spot profiles (contour lines of spots) with variations of curvature change rates in the sub-scanning direction within one beam on the exit surface of the long cylinder lens 63 in the lens configuration equivalent to the present embodiment, as comparative examples.

It is seen from the figure that the curvature change rate in the sub-scanning direction within one beam on the lens surface needs to be controlled to not more than 10% and desirably to not more than 5% in order to obtain a good spot shape.

Figure 4:
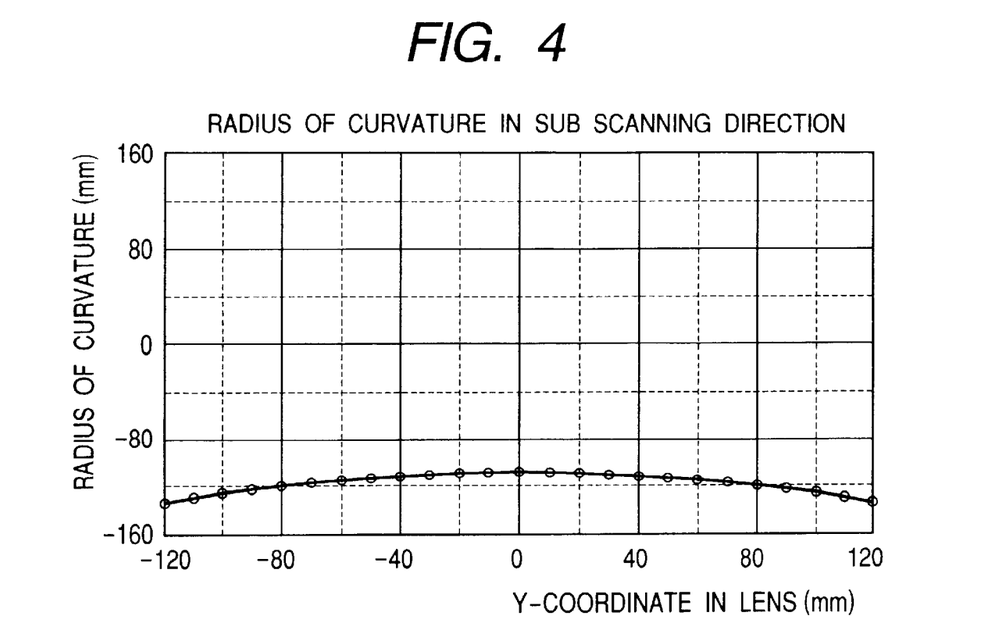
FIG. 4 is a diagram to show radii of curvatures in the sub-scanning direction of the exit surface of a long cylinder lens in Embodiment 1 of the present invention.

FIG. 4 is an explanatory diagram to show lens Y-coordinate dependence of the radii of curvatures in the sub-scanning direction of the exit surface R6 of the long cylinder lens 63 in the present embodiment.

In the present embodiment the beam size in the main scanning direction on the exit surface R6 of the long cylinder lens 63 is 4 mm and the maximum change rate of the curvatures in the sub-scanning direction within this beam size is 1.2%. Since the curvature change rate in the sub-scanning direction in the size of one beam is small, a good spot shape can be obtained on the surface to be scanned 6.

On the other hand, the shape in the main scanning direction of the long cylinder lens 63 is such that the both lens surfaces R5, R6 are of the surface shape with the center of curvature on the optical deflector 5 side. This is for locating the principal plane in the sub-scanning direction at each image height, at an optimal position by curving the shape of the lens with the largest power in the sub-scanning direction in the fθ lens system 12, toward the optical deflector 5.

Figure 5:
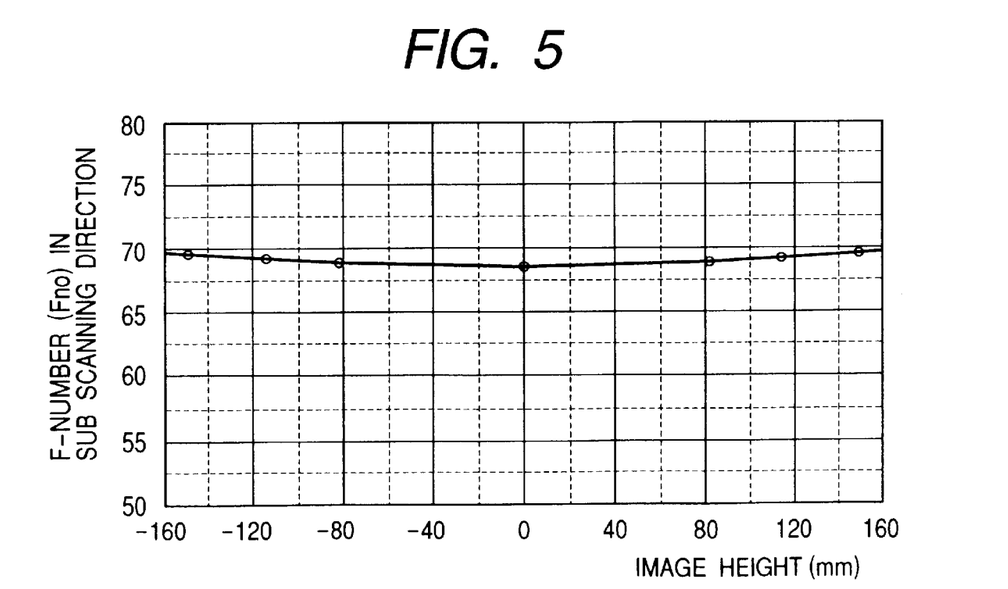
FIG. 5 is a diagram to show F-numbers in the sub-scanning direction on the surface to be scanned, in Embodiment 1 of the present invention.

FIG. 5 is an explanatory diagram to show Fno in the sub-scanning direction on the surface to be scanned in the present embodiment. It is seen from the same figure that the F-numbers Fno in the sub-scanning direction of the beam incident to the surface to be scanned are approximately constant in the effective scanning area (the effective image area) whereby image magnifications in the sub-scanning direction of the overall fθ lens system are uniform, so as to keep the spot sizes uniform in the sub-scanning direction. Namely, the present embodiment is set so that the image magnifications in the sub-scanning direction are approximately constant in the effective scanning area.

As described above, the present embodiment is arranged to continuously change the radii of curvatures in the sub-scanning direction of only the exit surface R6 of the long cylinder lens 63 out of the three lenses constituting the fθ lens system 12, from on the axis toward off the axis in the main scanning direction, set the rate of change of the curvatures in the sub-scanning direction within one beam on the exit surface R6 to not more than 10%, and optimize the shape in the main scanning direction of the long cylinder lens 63, whereby it becomes feasible to satisfy the image performance and the uniformity of image magnification in the sub-scanning direction in the effective scanning area, without quick change in the radii of curvatures in the sub-scanning direction, and thereby to realize the scanning optical apparatus excellent in the wavefront aberration, uniform in the spot size in the sub-scanning direction in the effective scanning area, and optimal for the high-definition image recording.

Embodiment 2

Figure 6:
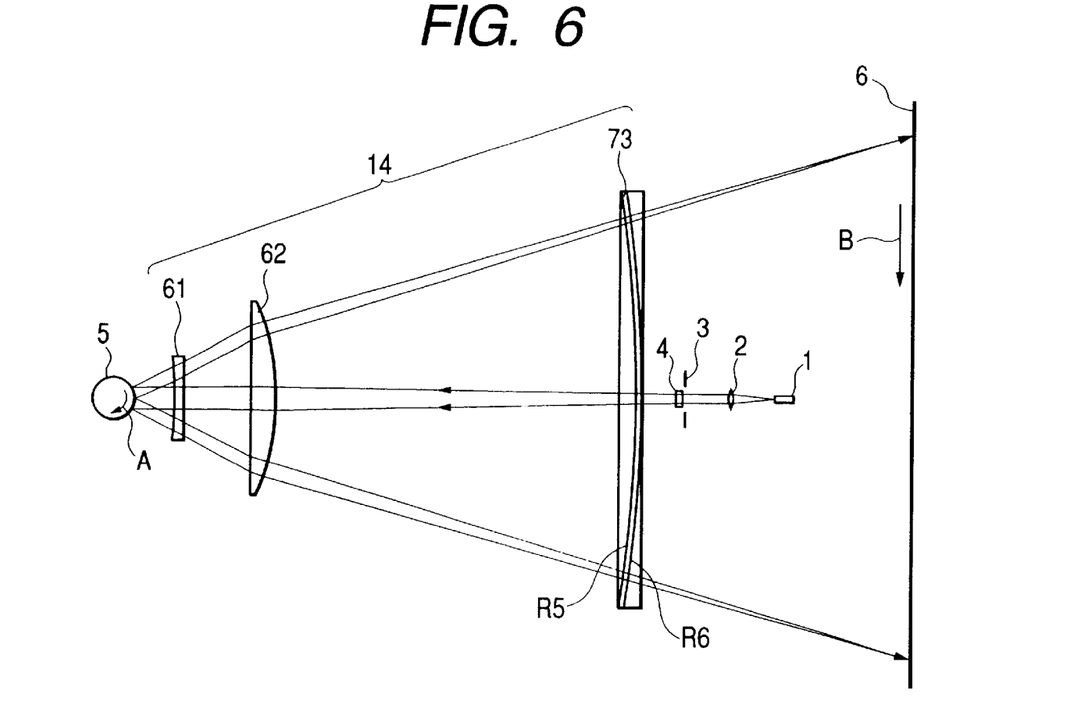
FIG. 6 is a cross-sectional view to show the major part in the main scanning direction of Embodiment 2 of the present invention.

FIG. 6 is a cross-sectional view of the major part in the main scanning direction (main scanning section) of the optical system in Embodiment 2 of the scanning optical apparatus of the present invention. In FIG. 6 the same elements as those in FIG. 1 are denoted by the same reference numerals.

The present embodiment is different from aforementioned Embodiment 1 in that the radii of curvatures in the sub-scanning direction of the both lens surfaces R5, R6 of the long cylinder lens 73 are continuously changed from on the axis toward off the axis in the main scanning direction, and the other structure and optical action are substantially the same as in Embodiment 1, thereby accomplishing like effects.

Namely, the present embodiment is adapted to continuously change the radii of curvatures in the sub-scanning direction of the two lens surfaces of the entrance surface R5 and the exit surface R6 of the long cylinder lens 73 from on the axis toward off the axis in the main scanning direction and set the rates of change of the curvatures in the sub-scanning direction within one beam on the two lens surfaces R5, R6 each to not more than 10%.

Figure 7:
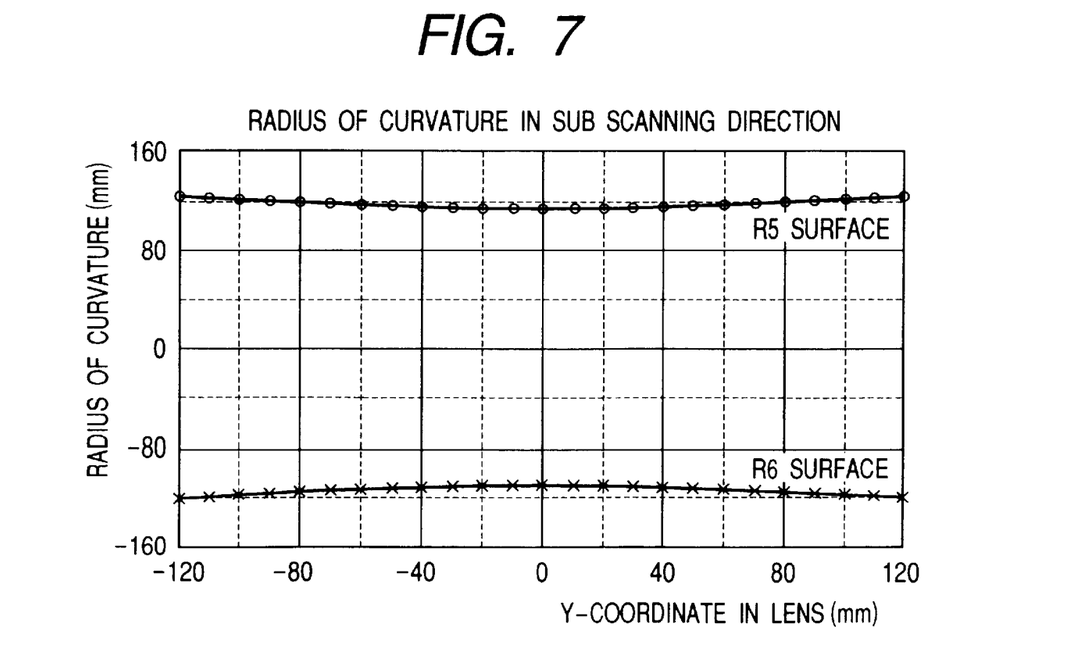
FIG. 7 is a diagram to show radii of curvatures in the sub-scanning direction of the entrance surface and exit surface of a long cylinder lens in Embodiment 2 of the present invention.

FIG. 7 is an explanatory diagram to show lens Y-coordinate dependence of the radii of curvatures in the sub-scanning direction of the two lens surfaces of the entrance surface R5 and exit surface R6 of the long cylinder lens 73 in the present embodiment.

In the present embodiment the maximum change rates of the curvatures in the sub-scanning direction within one beam on the entrance surface R5 and on the exit surface R6 of the long cylinder lens 73 are 0.6% (in the beam width of 4 mm) on the entrance surface R5 and 0.7% (in the beam width of 4 mm) on the exit surface R6. Since the curvature change rates in the sub-scanning direction within the size of one beam are small, a good spot shape can be obtained on the surface to be scanned 6.

On the other hand, the shape in the main scanning direction of the long cylinder lens 73 is such that the both lens surfaces R5, R6 are of the surface shape with the center of curvature on the optical deflector 5 side. This is for locating the principal plane in the sub-scanning direction at each image height, at an optimal position by curving the shape of the lens with the largest power in the sub-scanning direction in the fθ lens system 12, toward the optical deflector 5.

Figure 8:
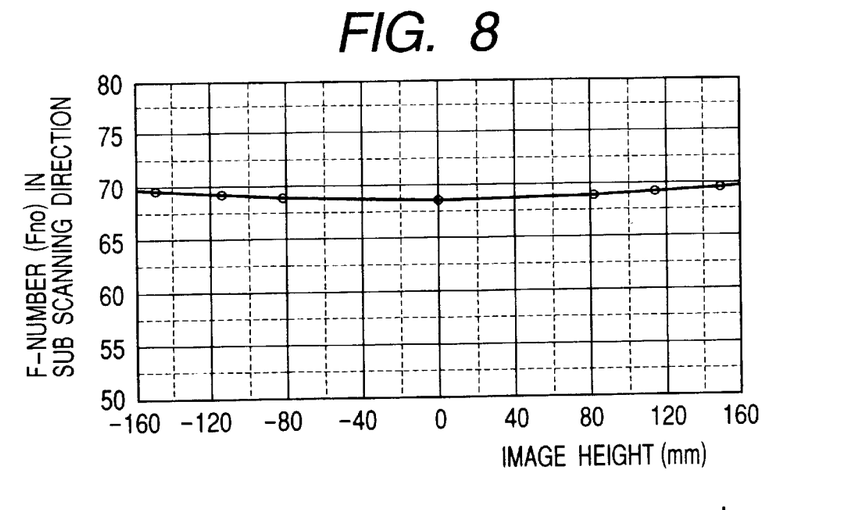
FIG. 8 is a diagram to show F-numbers in the sub-scanning direction on the surface to be scanned, in Embodiment 2 of the present invention.

FIG. 8 is an explanatory diagram to show Fno in the sub-scanning direction on the surface to be scanned in the present embodiment. It is seen from FIG. 8 that the F-numbers Fno in the sub-scanning direction of the beam incident to the surface to be scanned are approximately constant in the effective scanning area whereby image magnifications in the sub-scanning direction of the overall fθ lens system are uniform, so as to maintain the spot sizes uniform in the sub-scanning direction. Namely, the present embodiment is set so that the image magnifications in the sub-scanning direction are approximately constant in the effective scanning area.

As described above, the present embodiment is arranged to continuously change the radii of curvatures in the sub-scanning direction of the entrance surface R5 and the exit surface R6 of the long cylinder lens 73 out of the three lenses constituting the fθ lens system 14 as a third optical element, from on the axis toward off the axis in the main scanning direction, set the curvature change rates in the sub-scanning direction within one beam on the entrance surface R5 and on the exit surface R6 each to not more than 10%, and optimize the shape in the main scanning direction of the long cylinder lens 73, whereby it becomes feasible to satisfy the imaging performance and the uniformity of image magnification in the sub-scanning direction in the effective scanning area, without quick change in the radii of curvatures in the sub-scanning direction, and thereby to realize the scanning optical apparatus excellent in the wavefront aberration, uniform in the spot size in the sub-scanning direction in the effective scanning area, and optimal for the high-definition image recording.

Each of Embodiments 1, 2 described above was the scanning optical apparatus comprised of the overfield scanning optical system, but the present invention can also be applied in similar fashion to aforementioned Embodiments 1 and 2, to apparatus, for example, comprised of an underfield scanning optical system, without having to be limited to the overfield system.

Embodiment 3

Figure 9:
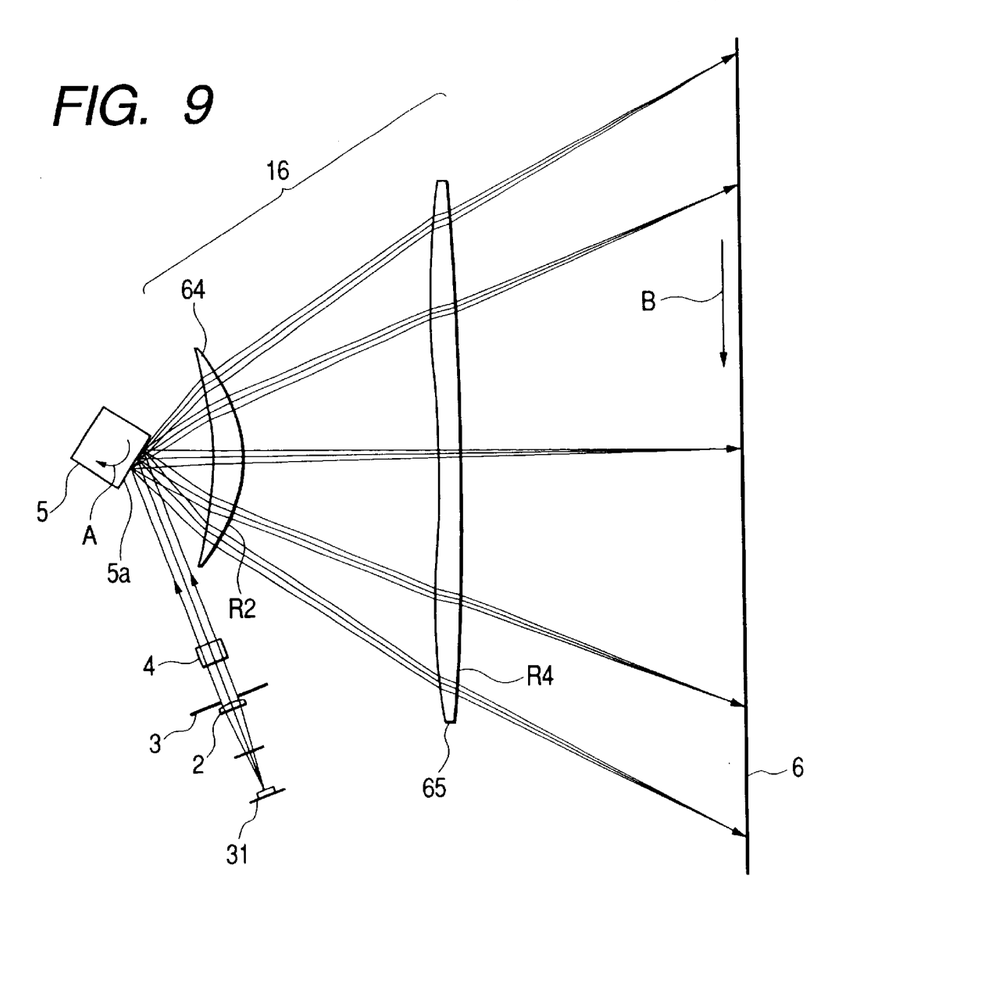
FIG. 9 is a cross-sectional view to show the major part in the main scanning direction of Embodiment 3 of the present invention.

FIG. 9 is a cross-sectional view of the major part in the main scanning direction (main scanning section) of Embodiment 3 of the scanning optical apparatus of the present invention. In FIG. 9 the same elements as those illustrated in FIG. 1 are denoted by the same reference numerals.

The present embodiment is different from aforementioned Embodiment 1 in that the light source means is a multi-beam laser 31 having a plurality of light emitting regions, in that the third optical element 16 consists of two lenses, in that beams are incident obliquely to a deflection facet of the optical deflector 5 in the main scanning section, and in that the system is comprised of a so-called underfield scanning optical system in which the beam width in the main scanning direction of the beams incident to the optical deflector 5 is smaller than the deflection facets in the main scanning direction, and the other structure and optical action are substantially the same as in Embodiment 1, thereby attaining like effects.

Specifically, in FIG. 9 numeral 31 designates the light source means, which consists, for example, of a multi-beam laser (multi-semiconductor laser) having a plurality of light emitting regions.

Numeral 16 denotes the fθ lens system (imaging optical system) with the fθ characteristic as the third optical element, which has two lenses, a first toric lens (toric lens) 64 and a second toric lens (long toric lens) 65 both made by plastic molding, in the order named from the side of the optical deflector 5. The overall system has predetermined refracting powers different from each other between in the main scanning direction and in the sub-scanning direction, focuses the beams based on image information, reflectively deflected by the optical deflector 5, on the surface to be scanned 6, and corrects the surface inclination of the deflection facets 5a of the optical deflector 5.

In the present embodiment the radii of curvatures in the sub-scanning direction of the exit surfaces R2, R4 of the respective first and second toric lenses 64, 65 are continuously changed from on the axis toward off the axis in the main scanning direction (the image height direction) and the rates of change of the curvatures in the sub-scanning direction within one beam on the respective exit surfaces R2, R4 are set each to not more than 10%.

In the present embodiment a plurality of diverging beams optically modulated and emitted from the multi-semiconductor laser 31 are converted into nearly parallel beams by the collimator lens 2 and the beams are limited in the amount of light by the aperture stop 3 to enter the cylindrical lens 4. The beams entering the cylindrical lens 4 emerge in the original state in the main scanning section. In the sub-scanning section the beams are converged to be focused as almost linear images (linear images elongated in the main scanning direction) on a deflection facet 5a of the optical deflector 5.

Then the plurality of beams reflectively deflected by the deflection facet 5a of the optical deflector 5 are guided through the first toric lens 64 and the second toric lens 65 onto the photosensitive drum surface 6 and optically scan (multi-scan) the area on the photosensitive drum surface 6 in the direction of arrow B (the main scanning direction) with rotation of the optical deflector 5 in the direction of arrow A. This implements the image recording on the photosensitive drum surface 6 as a recording medium.

Figure 10:
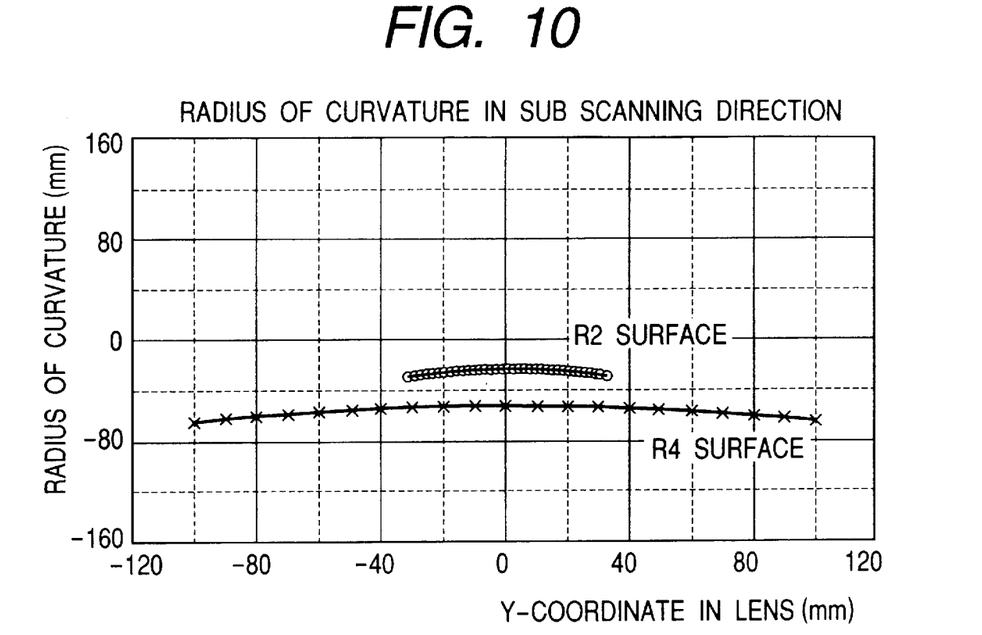
FIG. 10 is a diagram to show radii of curvatures in the sub-scanning direction of the exit surfaces of first and second toric lenses in Embodiment 3 of the present invention.

FIG. 10 is an explanatory diagram to show lens Y-coordinate dependence of the radii of curvatures in the sub-scanning direction of the exit surface R2 of the first toric lens 64 and the exit surface R4 of the second toric lens 65 in the present embodiment.

In the present embodiment the maximum change rates of the curvatures in the sub-scanning direction within one beam on the exit surfaces R2, R4 of the first and second toric lenses 64, 65 are 6.4% (in the beam width of 5 mm) on the exit surface R2 of the first toric lens 64 and 1.7% (in the beam width of 4 mm) on the exit surface R4 of the second toric lens 65. Since the curvature change rates in the sub-scanning direction within the size of one beam are small, a good spot shape can be obtained on the surface to be scanned 6.

On the other hand, the shape in the main scanning direction of the exit surface R4 of the second toric lens 65 is the surface shape with the center of curvature on the optical deflector 5 side. This is for locating the principal plane in the sub-scanning direction at each image height, at an optimal position by curving the shape of the lens surface with the largest power in the sub-scanning direction in the fϕ lens system 16, toward the optical deflector 5.

Figure 11:
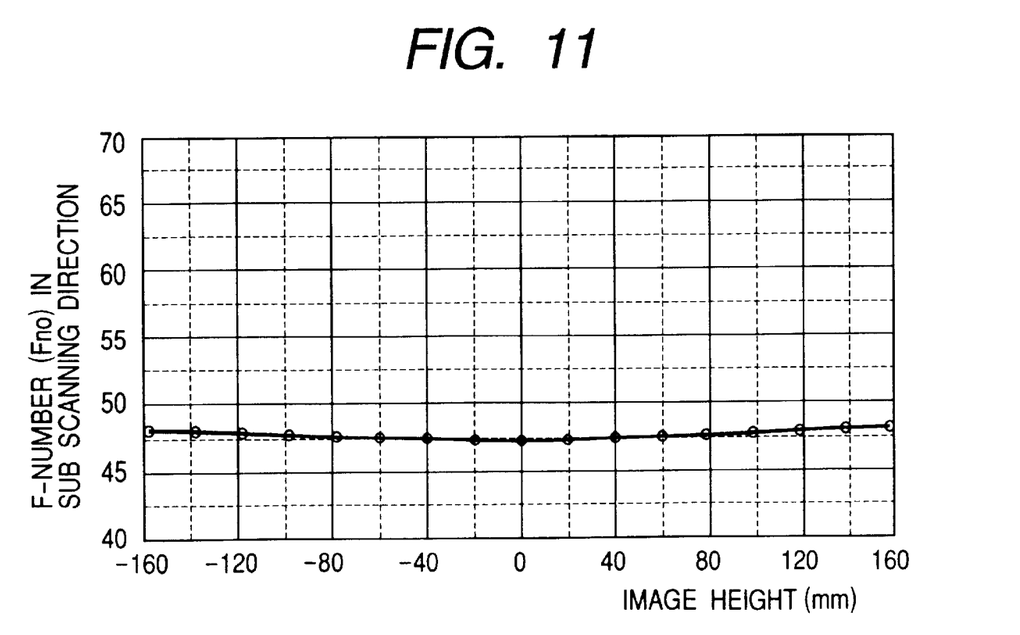
FIG. 11 is a diagram to show F-numbers in the sub-scanning direction on the surface to be scanned, in Embodiment 3 of the present invention.

FIG. 11 is an explanatory diagram to show Fno in the sub-scanning direction on the surface to be scanned in the present embodiment. It is seen from FIG. 11 that the F-numbers Fno in the sub-scanning direction of the beams incident to the surface to be scanned are approximately constant in the effective scanning area and the spot sizes in the sub-scanning direction of the overall fθ lens system are uniform. Since the image magnifications in the sub-scanning direction are also approximately constant in the effective scanning area, it becomes feasible to keep the spacing also constant in the sub-scanning direction between the plural beams on the surface to be scanned.

As described above, the present embodiment is arranged to continuously change the radii of curvatures in the sub-scanning direction of the exit surfaces R2, R4 of the respective first and second toric lenses 64, 65 constituting the fθ lens system 16 as the third optical element, set the rates of change of the curvatures in the sub-scanning direction within one beam on the exit surfaces R2, R4 each to not more than 10%, and optimize the shapes of the first and second toric lenses 64, 65 in the main scanning direction, whereby it becomes feasible to satisfy the imaging performance and the uniformity of image magnification in the sub-scanning direction in the effective scanning area, without quick change in the radii of curvatures in the sub-scanning direction, and thereby to realize the optical scanning apparatus excellent in the wavefront aberration, uniform in the spot size in the sub-scanning direction in the effective scanning area, and optimal for the high-definition image recording.

Further, a specific feature of the present embodiment is that it is feasible to also keep the spacing (adjacent pitch spacing) constant in the sub-scanning direction between the plural beams on the surface to be scanned, thereby enabling an image to be formed in high quality with reduced pitch unevenness.

In the present embodiment the light source means was constructed of the multi-semiconductor laser, but the light source means does not have to be limited to it; the present invention can also be applied in similar fashion to aforementioned Embodiment 3, to the apparatus with the light source means constructed of a single beam laser, of course.

Conditions in Each of the Embodiments

In each of Embodiments 1 to 3 described above, it is more preferable to satisfy at least one condition out of Conditions (1) to (3) described below. Namely, it is preferable to satisfy the following condition:

$$\phi mL < \phi sL \qquad (1),$$

where $\phi mL$ is the power in the main scanning direction of the lens La in which the radii of curvatures in the sub-scanning direction continuously change from on the axis toward off the axis in the main scanning direction, and $\phi sL$ the power of the lens in the sub-scanning direction.

It is also preferable to satisfy the following condition:

$$\phi mL/\phi mf < 0.5 \qquad (2),$$

where $\phi mL$ is the power in the main scanning direction of the above lens La and $\phi mf$ the power in the main scanning direction of the overall fθ lens system.

It is further preferable to satisfy the following condition:

$$0.5 < \phi sL/\phi sf \qquad (3),$$

where $\phi sL$ is the power in the sub-scanning direction of the above lens La and $\phi sf$ the power in the sub-scanning direction of the overall fθ lens system.

The lens in which the radii of curvatures in the sub-scanning direction continuously change from on the axis toward off the axis in the main scanning direction, is located at the position closest to the surface to be scanned 6, out of the two or more lenses composing the third optical element, and in Embodiments 1, 2 it is located on the surface-to-be-scanned 6 side with respect to a middle point between the deflection point on the optical deflector 5 and the surface to be scanned 6.

The number of lens surfaces in which the radii of curvatures in the sub-scanning direction continuously change from the on-axis toward the off-axis in the main scanning direction may be three or more, and the same effects as in the case of one or two lens surfaces in which the radii of curvatures in the sub-scanning direction continuously change from the on-axis toward the off-axis in the main scanning direction can be obtained even in the case that the number of such lens surfaces is three or more.

Image-Forming Apparatus

Figure 12:
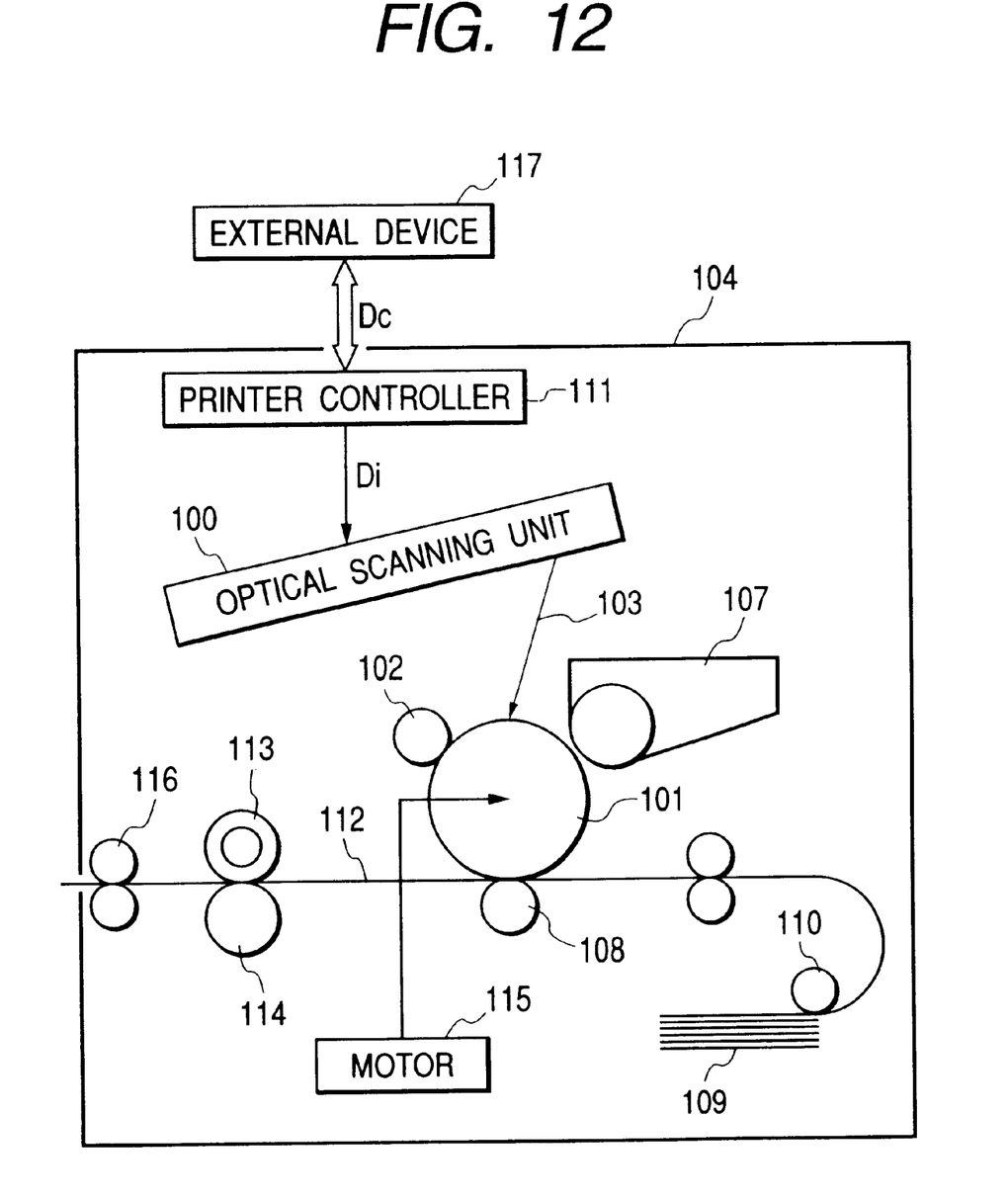
FIG. 12 is a cross-sectional view to show the major part in the sub-scanning direction of an image-forming apparatus of a background exposure type.

FIG. 12 is a cross-sectional view of the principal part along the sub-scanning direction to show an embodiment of the image-forming apparatus of the present invention. In FIG. 12, numeral 104 designates the image-forming apparatus. This image-forming apparatus 104 accepts input of code data Dc from an external device 117 such as a personal computer or the like. This code data Dc is converted into image data (dot data) Di by a printer controller 111 in the apparatus. This image data Di is supplied to an optical scanning unit 100 having the structure as described in either of Embodiments 1 to 3. This optical scanning unit 100 outputs a light beam 103 modulated according to the image data Di and this light beam 103 scans a photosensitive surface of a photosensitive drum 101 in the main scanning direction.

The photosensitive drum 101 as an electrostatic latent image carrier (photosensitive body) is rotated clockwise by a motor 115. With the rotation thereof, the photosensitive surface of the photosensitive drum 101 moves in the sub-scanning direction perpendicular to the main scanning direction, relative to the light beam 103. Above the photo-sensitive drum 101, a charging roller 102 for uniformly charging the surface of the photosensitive drum 101 is disposed so as to contact the surface. Then the surface of the photosensitive drum 101 charged by the charging roller 102 is exposed to the light beam 103 under scanning by the optical scanning unit 100.

As described previously, the light beam 103 is modulated based on the image data Di and an electrostatic latent image is formed on the surface of the photosensitive drum 101 by exposure to this light beam 103. This electrostatic latent image is developed into a toner image by a developing unit 107 disposed so as to contact the photosensitive drum 101 downstream in the rotating direction of the photosensitive drum 101 from the exposure position to the light beam 101.

The toner image developed by the developing unit 107 is transferred onto a sheet 112 being a transfer medium, by a transfer roller 108 opposed to the photosensitive drum 101 below the photosensitive drum 101. Sheets 112 are stored in a sheet cassette 109 in front of (i.e., on the right side in FIG. 12) of the photosensitive drum 101, but sheet feed can also be implemented by hand feeding. A sheet feed roller 110 is disposed at an end of the sheet cassette 109 and feeds each sheet 112 in the sheet cassette 109 into the conveyance path.

The sheet 112 onto which the toner image unfixed was transferred as described above, is further transferred to a fixing unit located behind the photosensitive drum 101 (i.e., on the left side in FIG. 12). The fixing unit is composed of a fixing roller 113 having a fixing heater (not illustrated) inside and a pressing roller 114 disposed in press contact with the fixing roller 113 and heats under pressure the sheet 112 thus conveyed from the transfer part, in the nip part between the fixing roller 113 and the pressing roller 114 to fix the unfixed toner image on the sheet 112. Sheet discharge rollers 116 are disposed further behind the fixing roller 113 to discharge the fixed sheet 112 to the outside of the image-forming apparatus.

Although not illustrated in FIG. 12, the print controller 111 also performs control of each section in the image-forming apparatus, including the motor 115, and control of the polygon motor etc. in the optical scanning unit described previously, in addition to the conversion of data described above.

Image-Forming Apparatus of Background Type

The above image-forming apparatus is also suitably constructed, for example, as an image-forming apparatus of the so-called background exposure type in which portions not exposed to the spot focused on the surface to be scanned are developed as an image.

In the image-forming apparatus of this background type, there is a common tendency that stripe unevenness becomes conspicuous on the image with change in the spot size on the surface to be scanned. Therefore, a combination with the scanning optical apparatus of the embodiments to keep the spot size even in the sub-scanning direction is effective to reduction in stripe unevenness of the image-forming apparatus of this type.

Numerical Examples

Numerical Examples 1 to 3 of the structure of the optical deflector and the third optical element (fθ lens system) in respective Embodiments 1 to 3 described above are presented in Tables 1 to 4 below. The relation between aforementioned Conditions (2), (3) and various numerals in the numerical examples is also presented in Table 5.

TABLE 1

| Numerical Example 1 | | | | | |
|---|---|---|---|---|---|
| Wavelength | | | 655 nm | | |
| Number of polygon facets | | | 12 | | |
| Diameter of circumscribed circle about polygon | | | 29 | | |
| Angle of incidence to polygon | main scan | | 0 | | |
| Angle of incidence to polygon | sub scan | | −0.8 | | |

| | | Radius of curvature | | Spacing D | Index of refraction nd | Abbe's number vd |
|---|---|---|---|---|---|---|
| | | main scan R | sub scan r | | | |
| Polygon facet 5 | | ∞ | | 25.0 | | |
| Concave spherical lens 61 | R1 | −356 | | 4.0 | 1.78472 | 25.68 |
| | R2 | ∞ | | 41.5 | | |

TABLE 1-continued

| | | | | | | |
|---|---|---|---|---|---|---|
| Convex cylinder lens 62 | R3 | ∞ | | 15.0 | 1.70154 | 41.24 |
| | R4 | −152.57 | ∞ | 299.4 | | |
| Long cylinder lens 63 | R5 | −1000 | 114.115 | 4.0 | 1.53041 | 55.50 |
| | R6 | −1000 | −108.212 | 167.6 | | |
| Drum surface 8 | | ∞ | | | | |

| Aspherical coefficient | Long cylinder lens 63 | |
|---|---|---|
| | R5 | R6 |
| D2 | 0.0000E + 00 | 1.5591B − 05 |

| | |
|---|---|
| φmL | 7.2882E − 07 |
| φsL | 9.4393E − 03 |
| φmf | 2.9052E − 03 |
| φsf | 9.4393E − 03 |

TABLE 2

Numerical Example 2

| | | |
|---|---|---|
| Wavelength | | 655 nm |
| Number of polygon facets | | 12 |
| Diameter of circumscribed circle about polygon | | 29 |
| Angle of incidence to polygon | main scan | 0 |
| Angle of incidence to polygon | sub scan | −0.8 |

| | | Radius of curvature | | Spacing D | Index of refraction nd | Abbe's number νd |
|---|---|---|---|---|---|---|
| | | main scan R | sub scan r | | | |
| Polygon facet 5 | | ∞ | | 25.0 | | |
| Concave spherical lens 61 | R1 | −356 | | 4.0 | 1.78472 | 25.68 |
| | R2 | ∞ | | 41.5 | | |
| Convex cylinder lens 62 | R3 | ∞ | | 15.0 | 1.70154 | 41.24 |
| | R4 | −152.57 | ∞ | 299.4 | | |
| Long cylinder lens 73 | R5 | −1000 | 114.115 | 4.0 | 1.53041 | 55.50 |
| | R6 | −1000 | −108.212 | 167.6 | | |
| Drum surface 8 | | ∞ | | | | |

| Aspherical coefficient | Long cylinder lens 63 | |
|---|---|---|
| | R5 | R6 |
| D2 | 6.6345E − 06 | 8.0461E − 06 |

| | |
|---|---|
| φmL | 7.2882E − 07 |
| φsL | 9.4393E − 03 |
| φmf | 2.9052E − 03 |
| φsf | 9.4393E − 03 |

TABLE 3

Numerical Example 3

| | | |
|---|---|---|
| Wavelength | | 780 nm |
| Number of polygon facets | | 4 |
| Diameter of circumscribed circle about polygon | | 20 |
| Angle of incidence to polygon | main scan | −70 |
| Angle of incidence to polygon | sub scan | 0 |

| | | Radius of curvature | | Spacing D | Index of refraction nd | Abbe's number νd |
|---|---|---|---|---|---|---|
| | | main scan R | sub scan r | | | |
| Polygon facet 5 | | ∞ | | 30.0 | | |
| Toric lens 64 | R1 | −88.4696 | 125.792 | 11.0 | 1.5306 | 55.5 |
| | R2 | −46.3992 | −23.2332 | 75.0 | | |
| Long toric lens 65 | R3 | −392.336 | ∞ | 8.0 | 1.5306 | 55.5 |
| | R4 | −1299.61 | −51.6075 | 109.3 | | |
| Drum surface 8 | | ∞ | | | | |

| Aspherical coefficient in main scanning direction | Toric lens 64 | | Long toric lens 65 | |
|---|---|---|---|---|
| | R1 | R2 | R3 | R4 |
| K | −5.3919E − 01 | −8.4605E − 01 | −6.0160E + 01 | 1.4945E + 01 |
| B4 | 1.1600E − 06 | 3.1227B − 07 | 2.1181E − 07 | 2.0402E − 08 |
| B6 | 1.3454E − 09 | 5.2023E − 10 | −2.0371E − 11 | −3.1687E − 12 |
| B8 | −1.0869E − 12 | 5.3370E − 13 | 1.1352E − 15 | 2.5003E − 16 |
| B10 | 1.8381E − 16 | −3.9110B − 16 | −2.8961E − 20 | −8.3205E − 21 |
| D2s | | 1.6111E − 04 | | 1.7411E − 05 |
| D4s | | 4.3136E − 08 | | 3.4739E − 09 |
| D6s | | −4.7776E − 12 | | −1.0058E − 12 |
| D8s | | −1.9275E − 16 | | 1.2191E − 16 |
| D10s | | 3.0513E − 18 | | −5.2795E − 21 |
| D2e | | 2.3894E − 04 | | 4.3841E − 05 |
| D43e | | −3.3019E − 08 | | −9.5098E − 09 |
| D6e | | 3.7861E − 11 | | 2.2922E − 12 |
| D8e | | 3.0235E − 15 | | −2.5033E − 16 |
| D10e | | 1.2754E − 18 | | 9.8322E − 21 |

TABLE 4

Numerical Example 3

| | |
|---|---|
| φmL | −9.2989E − 04 |
| φsL | 1.0163E − 02 |
| φmf | 5.2818E − 03 |
| φsf | 1.4620E − 02 |

TABLE 5

| Condition | Numerical Example | | |
|---|---|---|---|
| | 1 | 2 | 3 |
| (2) φmL/φmf | 0.0003 | 0.0003 | −0.176 |
| (3) φsL/φsf | 1.0000 | 1.0000 | 0.695 |

According to the present invention, as described above, the apparatus is so constructed that the third optical element is comprised of two or more lenses, that the radii of curvatures in the sub-scanning direction of the lens surface of at least one lens out of them are continuously changed from on the axis toward off the axis in the main scanning direction, that the rate of change of the curvatures in the sub-scanning direction within one beam on the lens surface is not more than 10%, and that the shape in the main scanning direction of the lens having the lens surface is determined so that the F-numbers in the sub-scanning direction of the beam incident to the surface to be scanned are approximately constant, in the effective scanning area, whereby the spot size in the sub-scanning direction can be equalized in the effective scanning area and whereby the adjacent pitch spacing can be equalized in the effective scanning area in the multi-beam scanning, thereby accomplishing the compact scanning optical apparatus optimal for the high-definition image recording and the image-forming apparatus using it.

What is claimed is:

1. A scanning optical apparatus comprising:
   a deflecting element for reflectively deflecting a beam emitted from light source means, into a main scanning direction; and
   an optical element for focusing the beam reflectively deflected by said deflecting element, on a surface to be scanned,
   wherein said optical element comprises two or more lenses, radii of curvatures in a sub-scanning direction of at least one lens surface of at least one lens out of said two or more lenses continuously change from on the axis toward off the axis in the main scanning direction, a rate of change of the curvatures in the sub-scanning direction within one beam on the lens surface is set to not more than 10%, and a shape of the at least one lens in the main scanning direction is determined so that F-numbers in the sub-scanning direction of the beam incident to the surface to be scanned are approximately constant in an effective scanning area, and
   wherein the at least one lens is disposed on a surface-to-be-scanned side with respect to a middle point between a deflection point on said deflecting element and the surface to be scanned.

2. The scanning optical apparatus according to claim 1, wherein the shape of the at least one lens in the main scanning direction is determined so that at least one lens surface has a center of curvature on a deflecting element side.

3. The scanning optical apparatus according to claim 1, wherein the at least one lens is located at a position closest to the surface to be scanned, out of the two or more lenses constituting said optical element.

4. The scanning optical apparatus according to claim 3, wherein the following condition is satisfied:

$$\phi mL < \phi sL,$$

where φmL is a power of the at least one lens in the main scanning direction and φsL a power thereof in the sub-scanning direction.

5. The scanning optical apparatus according to claim 3, wherein the following condition is satisfied:

$$\phi mL/\phi mf < 0.5,$$

where φmL is a power of the at least one lens in the main scanning direction and φmf a power of the whole of said optical element in the main scanning direction.

6. The scanning optical apparatus according to claim 3, wherein the following condition is satisfied:

$$0.5 < \phi sL/\phi sf,$$

where φsL is a power of the at least one lens in the sub-scanning direction and φsf a power of the whole of said optical element in the sub-scanning direction.

7. The scanning optical apparatus according to claim 1, wherein the at least one lens La is made by plastic molding.

8. The scanning optical apparatus according to claim 1, wherein image magnifications in the sub-scanning direction are approximately constant in the effective scanning area.

9. The scanning optical apparatus according to claim 1, wherein said light source means comprises a plurality of light emitting regions.

10. The scanning optical apparatus according to claim 1, wherein the beam emitted from said light source means is focused in the form of a linear beam longer than one deflection facet out of a plurality of deflection facets of the deflecting element in the main scanning direction, on the deflection facet.

11. An image-forming apparatus comprising the scanning optical apparatus as set forth in any one of claims 1 to 10, and a printer controller for converting code data supplied from an external device, into an image signal and then entering the image signal into said scanning optical apparatus.

12. The image-forming apparatus according to claim 11, wherein an image is formed by background exposure.

* * * * *

UNITED STATES PATENT AND TRADEMARK OFFICE
CERTIFICATE OF CORRECTION

PATENT NO.     : 6,542,278 B2
DATED          : April 1, 2003
INVENTOR(S)    : Manabu Kato It is certified that error appears in the above-identified patent and that said Letters Patent is hereby corrected as shown below:

Column 1,
Line 16, "f-characteristic" should read -- fθ characteristic --.

Column 3,
Line 6, "φsL" should read -- φmf --.

Column 4,
Line 53, "f-characteristic" should read -- fθ characteristic --.

Column 6,
Line 58, "the both" should read -- both --.

Column 7,
Lines 38 and 67, "the both" should read -- both --.

Column 10,
Line 55, "φmf" should read -- φmf is --; and
Line 62, "φsf" should read -- φsf is --.

Column 16,
Line 34, "lens La" should read -- lens --.

Signed and Sealed this

Twenty-eighth Day of October, 2003

JAMES E. ROGAN
*Director of the United States Patent and Trademark Office*